(12) United States Patent
Liu

(10) Patent No.: US 11,336,067 B2
(45) Date of Patent: May 17, 2022

(54) HINGE ADAPTERS

(71) Applicant: Hewlett-Packard Development Company, L.P., Spring, TX (US)

(72) Inventor: Chyun Nan Liu, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/054,534

(22) PCT Filed: Sep. 14, 2018

(86) PCT No.: PCT/US2018/051188
§ 371 (c)(1),
(2) Date: Nov. 11, 2020

(87) PCT Pub. No.: WO2020/055432
PCT Pub. Date: Mar. 19, 2020

(65) Prior Publication Data
US 2021/0313750 A1    Oct. 7, 2021

(51) Int. Cl.
*G06F 1/16* (2006.01)
*H01R 31/06* (2006.01)
*H01R 35/02* (2006.01)
*H01R 13/62* (2006.01)

(52) U.S. Cl.
CPC .......... *H01R 31/06* (2013.01); *G06F 1/1618* (2013.01); *G06F 1/1654* (2013.01); *G06F 1/1681* (2013.01); *G06F 1/1683* (2013.01); *H01R 35/02* (2013.01); *H01R 13/6205* (2013.01)

(58) Field of Classification Search
CPC .... G06F 1/1615; G06F 1/1616; G06F 1/1618; G06F 1/162; G06F 1/1681
See application file for complete search history.

(56) References Cited

U.S. PATENT DOCUMENTS

| | | | |
|---|---|---|---|
| 8,753,128 B2 | 6/2014 | Alameh et al. | |
| D708,605 S * | 7/2014 | Yang | .......................... D14/315 |
| 8,854,799 B2 * | 10/2014 | Whitt, III | ............. G06F 3/0219 361/679.02 |
| 9,083,778 B2 | 7/2015 | Kim | |
| 9,256,255 B2 * | 2/2016 | Chang | ................... G06F 1/1632 |
| 9,360,896 B2 | 6/2016 | Lim et al. | |
| 9,411,365 B1 | 8/2016 | Tanner et al. | |
| 9,426,905 B2 | 8/2016 | Bathiche et al. | |
| 9,678,542 B2 * | 6/2017 | Whitt, III | ............. G06F 1/1681 |
| 9,983,627 B1 | 5/2018 | Pelissier et al. | |
| 10,041,282 B2 | 8/2018 | Cheah et al. | |
| 10,205,272 B2 * | 2/2019 | Kiani | ...................... H01R 11/30 |
| 10,256,568 B2 * | 4/2019 | Bdeir | ................. H01R 13/6205 |

(Continued)

FOREIGN PATENT DOCUMENTS

EP    2863286 A1    4/2015

*Primary Examiner* — Adrian S Wilson
(74) *Attorney, Agent, or Firm* — HP Inc. Patent Department

(57) ABSTRACT

In an example, a hinge adapter may include a first connector portion to removably engage with a first electronic device, and a second connector portion to removably operably engage with a second electronic device. Further, the hinge adapter may include a hinge connecting the first connector portion and the second connector portion. The first connector portion may rotate relative to the second connector portion via the hinge.

15 Claims, 6 Drawing Sheets

(56) References Cited

U.S. PATENT DOCUMENTS

| | | | |
|---|---|---|---|
| 10,353,435 B2* | 7/2019 | Deng | G06F 1/1662 |
| 10,359,848 B2* | 7/2019 | Winter | G06F 3/03547 |
| 10,401,905 B2* | 9/2019 | Carnevali | G06F 1/1626 |
| 10,678,743 B2* | 6/2020 | Drasnin | G06F 11/328 |
| 10,788,865 B1* | 9/2020 | Files | G06F 1/1616 |
| 2008/0232061 A1* | 9/2008 | Wang | G06F 1/1632 |
| | | | 361/679.41 |
| 2015/0055289 A1* | 2/2015 | Chang | G06F 1/1632 |
| | | | 361/679.43 |
| 2016/0041348 A1 | 2/2016 | Isenhour | |
| 2016/0124569 A1 | 5/2016 | Woo et al. | |
| 2016/0306396 A1 | 10/2016 | Bathiche et al. | |

* cited by examiner

HINGE ADAPTERS

BACKGROUND

Electronic devices may include computing devices such as laptops or notebook computers, personal computers (PCs), desktop computers, tablet computers, smartphones, e-readers, and other types of computing devices. Notebook or laptop computers may include traditional clamshell-style computing devices, as well as hybrid notebooks such as 2-in-1 laptops, 360 degree laptops, and/or convertible laptops, which may operate in a traditional clamshell-style, as well as have the ability to mechanically re-orient to a tablet-style computing device. Such devices may include a touch-screen display to enable tablet-style functionality.

DETAILED DESCRIPTION

Electronic devices may include computing devices. Computing devices are designed to fulfill usage needs and user preferences, and thus may take on different forms such as laptops or notebook computers, personal computers (PCs), desktop computers, tablet computers, smartphones, e-readers, and other types of computing devices. Notebook or laptop computers may further include traditional clamshell-style computing devices, as well as hybrid notebooks such as 2-in-1 laptops, 360 degree laptops, and/or convertible laptops, which may operate in a traditional clamshell-style, as well as have the ability to mechanically re-orient to a tablet-style computing device. Such devices may include a touch-screen display to enable tablet-style functionality.

Some types of 2-in-1 computing dev ices may provide dual functionalities of both a clamshell notebook and a tablet computer, but, as a result, may have bulky and/or relatively heavy characteristics. In some situations, it may be desirable to have a computing device that may operate as a tablet or as a clamshell notebook, but still retain a thin and light design. Accordingly, other types of computing devices may include a display portion with a removable keyboard portion, to provide a lighter and thinner device when used in tablet-style mode. Often times, the keyboard portion can only function as a keyboard, and, when detached from the display portion, serves no purpose at all.

Therefore, it may be desirable to provide a computing device that may operate in both a clamshell notebook mode and a tablet mode, while also maintaining a thin and light design. Further, it may be desirable that such a computing device be separable into different devices, both or each of which maintain a usefulness when detached from one another. Finally, it may be further desirable that one of the separable devices be able to provide more functionality than just a standard keyboard. In other situations, it may be desirable to take two existing computing devices and be able to combine them together to achieve additional functionality, e.g., functionality similar to a clamshell-style computing device.

Implementations of the present disclosure provide hinge adapters which may enable two different electronic dev ices to be assembled together and to operate as a single combined device. The example lunge adapters may include a hinge such that the combined devices may operate as a clamshell notebook, a tablet-style device, a device in a tent or presentation mode, or other modes of use. Additionally, such combined devices maintain die ability to be fully separated into two fully-functional electronic devices.

Figure 1A:
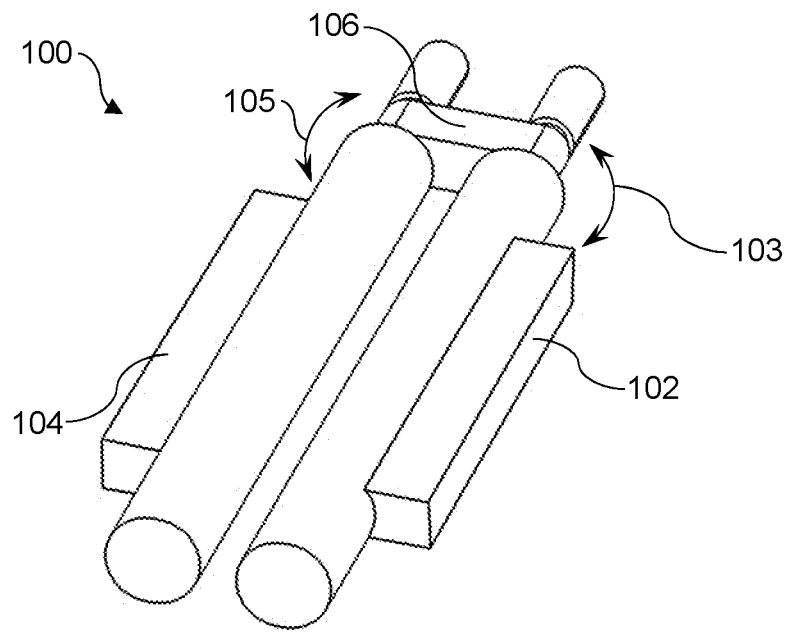
FIG. 1A is a perspective view of example hinge adapter.

Referring now to FIG. 1A, a perspective view of an example hinge adapter 100 is illustrated. Hinge adapter 100 may include a first connector portion 102 to removably operably engage with a first electronic device, and a second connector portion 104 to removably operably engage with a second electronic device. In this context, removably engage may refer to the ability of each connector portion to be able to attach to an electronic device, and then to be able to subsequently be detached or removed, and such attachment and detachment ability is repeatable. Additionally, in this context, operably engage may refer to the ability of each connector portion to both mechanically and communicatively connect with an electronic device, e.g., through a communication port. Stated differently, first and second connector portions 102 and 104 may each be able to mechanically and/or or structurally engage with a separate electronic device, and, in some implementations, may also be able to electrically or communicatively engage with each respective electronic device. Thus, in some examples, each of the first connector portion 102 and the second connector portion 204 may include an electrical connector and a mechanical connector so as to both electrically and mechanically engage with complementary electrical connectors and mechanical connectors of the respective electronic device. Each of the first and second connector portions 102 and 104 may include any number of latches, posts, magnets, clips, pins, contacts, or other types of mechanical and electrical connectors and/or interfaces to accomplish such engagement.

Figure 1B:
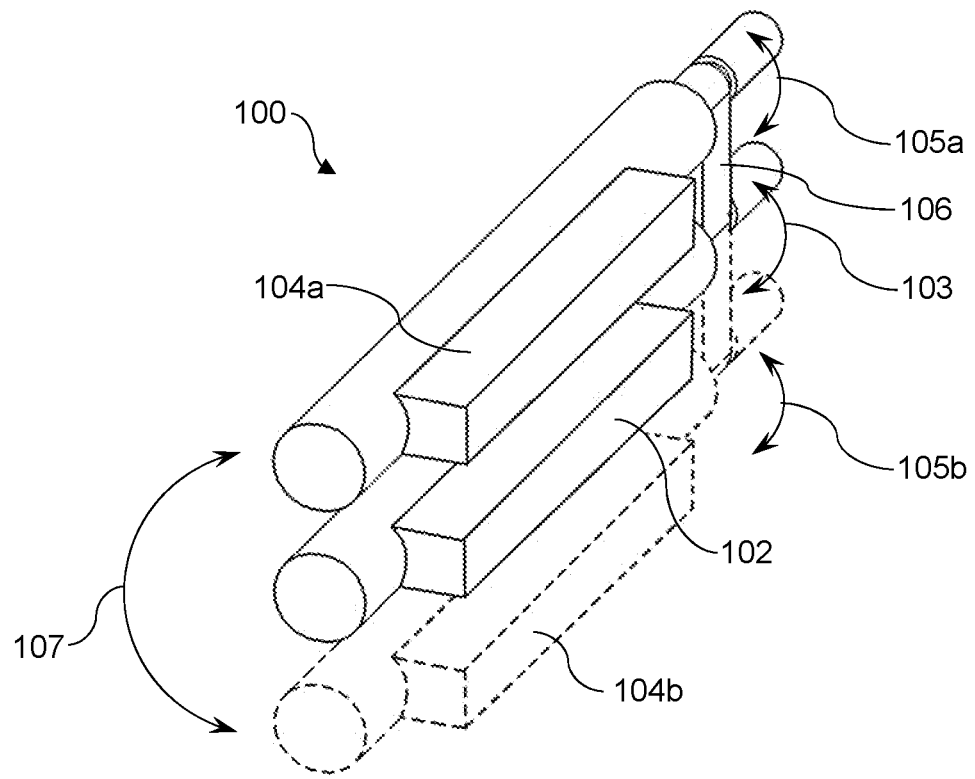
FIG. 1B is another perspective view of the example hinge adapter of FIG. 1A.

Further, the hinge adapter 100 may include a hinge 106 connecting the first connector portion 102 and the second connector portion 104 such that either of the first connector portion 102 and the second connector portion 104 can move or rotate relative to the other. For example, the hinge 106 may enable the first connector portion 102 to rotate along direction 103 relative to the second connector portion 104, and the hinge 106 may enable the second connector portion 104 to rotate along direction 105 relative to rise first connector portion 102. Thus, the movement of either the first or second connector portions 102 and 104, plus the movement of the hinge 106 itself, may enable either of the first and second connector portions 102 and 104 to rotate relative to the other. The degree of rotation of each of the connector portions may be anywhere between zero and 360 degrees, relative to the other connector portion. In other words, the rotation 103 of the first connector portion 102 relative to the hinge 106 may be at least 180 degrees, and the rotation 105 of the hinge 106 relative to the second connector portion 104 may also be at least 180 degrees, resulting in a total rotation of the first connector portion 102 relative to the second connector portion 104 of at least 360 degrees. Rotation of the second connector portion 104 relative to the first connector portion 102 may have a similar range. Referring additionally to FIG. 1B, another perspective view of example hinge adapter 100 is illustrated to further describe such movement of the first and second connector portions 102 and 104.

FIG. 1B illustrates first connector portion 102 in a stationary position, with second connector portion 104 in two different positions, represented as second connector portion 104a and second connector portion 104b, shown in phantom lines. Second connector portion 104a may start in the position illustrated in FIG. 1A, and then may move along direction 107 relative to first connector portion 102 so as to be disposed in a position relatively above first connector portion 102. Such movement is enabled by rotation 103 between the hinge 106 and the first connector portion 102, with first connector portion 102 remaining stationary, and also by rotation 105a between the hinge 106 and the second connector portion 104a. Such movement results in a 180 degree movement of the second connector portion 104a relative to the first connector portion 102, from facing in opposite directions as illustrated in FIG. 1A, to facing the same direction as illustrated in FIG. 1B. A similar movement is possible to dispose the second connector portion 104b relatively below the first connector portion 102. Further, second connector portion 104a can also be moved from the position directly above first connector portion 102, along direction 107, to the position illustrated by second connector portion 104b, directly below first connector portion 102 and vice versa. Such movement results in second connector portion 104 moving 360 degrees relative to first connector portion 102, with the second connector portion 104 facing the same direction in both the starting and ending positions. 180 degrees of such movement is carried out by rotation 105a, and an additional 180 degrees of such movement is carried out by rotation 103. Although described as motion of the second connector portion 104 relative to the first connector portion 102, it should be noted that similar motion of the first connector portion 102 relative to the second connector portion 104 is also able to occur.

Figure 2A:
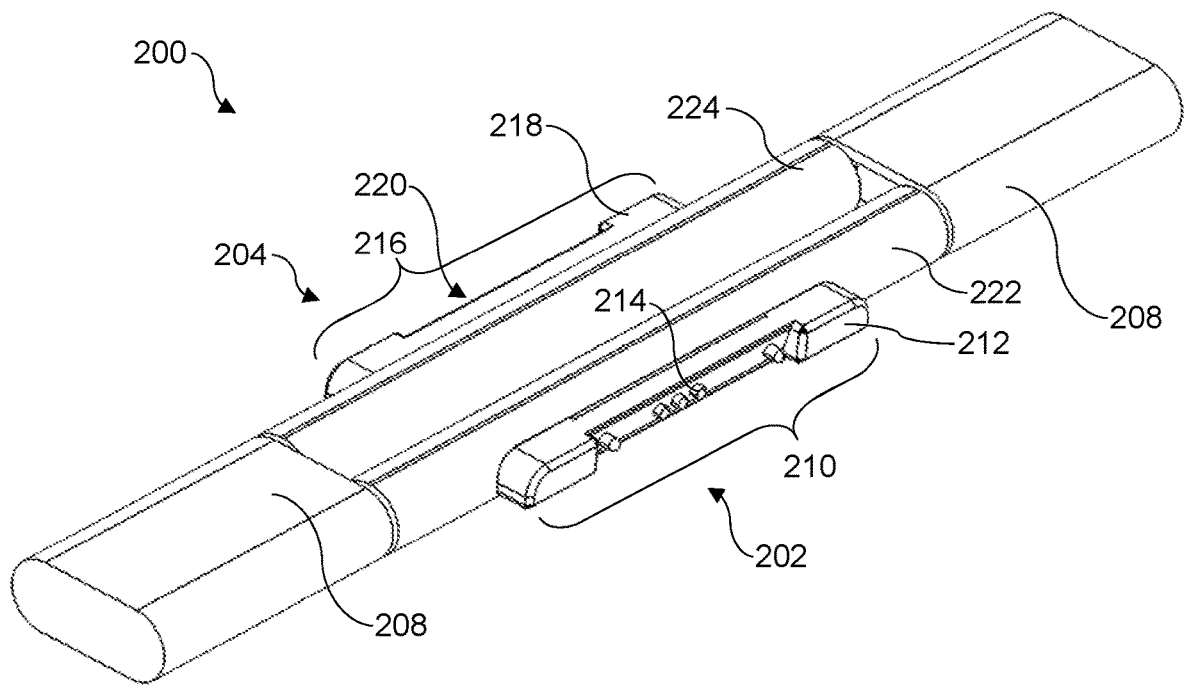
FIG. 2A is a perspective view of another example hinge adapter.
Figure 2B:
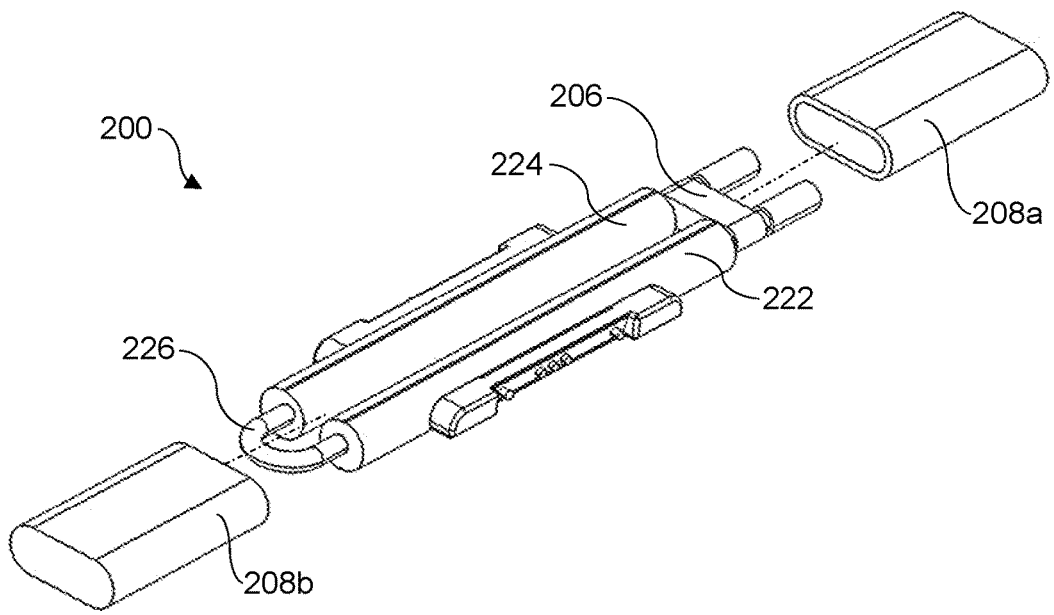
FIG. 2B is a perspective exploded view of the example hinge adapter of FIG. 2A.

Referring now to FIGS. 2A-2B, a perspective view and a partially-exploded perspective view of another example hinge adapter 200 is illustrated. Example hinge adapter 200 may be similar to example hinge adapter 100, described above. Further, the similarly-named elements of example hinge adapter 200 may be similar in function and/or structure to the respective elements of example hinge adapter 100, as they are described above. Hinge adapter 200 may include a first connector portion 202, a second connector portion 204, and a hinge 206.

The hinge 206 may be engaged with a first end of the first and second connector portions 202 and 204 such that either or each of the first connector portion 202 and second connector portion 204 can move or rotate 360 degrees around or relative to the other. In some examples, the first connector portion 202 may have a first tubular structure, e.g., first sleeve 222, and the second connector portion 204 may have a second tubular structure, e.g., second sleeve 224, such that the hinge 206 enables each of the first and second connector portions 202 and 204 to rotate axially relative to the other, i.e., about a central axis of each connector portion.

In some implementations, the first and second connector portions 202 and 204 may be arranged or aligned with one another in a substantially parallel configuration.

The first connector portion 202 and the second connector portion 204 may each mechanically and electrically engage with a separate electronic device. The first connector portion 202 may have a first electrical connector 214 and a first mechanical connector 212. In some examples, the first connector portion 202 may have a first engagement portion 210, of which the first electrical connector 214 and the first mechanical connector 212 are a part. In some examples, the first engagement portion 210 may be a boss, protrusion, shelf, or other member that extends radially from a side of the first sleeve 222. The first engagement portion 210 may removably attach to or engage with a complementary communication port on the respective electronic device. Similarly, in some examples, the second connector portion 204 may have a second engagement portion 216, which may include a second electrical connector 220 and a second mechanical connector 218. The second engagement portion 216 may also be a boss, protrusion, shelf, or other suitable member that extends radially from a side of the second sleeve 224. The second engagement portion 216 may removably attach to or engage with a complementary communication port on the other respective electronic device. In some implementations, the first and second engagement portions 210 and 216 may be centrally disposed along a length of tire respective connector portion. Additionally, in further implementations, the first and second engagement portions 210 and 216 may face in opposing directions, i.e., the electrical and/or mechanical connectors thereof may be pointed in opposing directions to one another, when the hinge 206 is flat and/or unrotated, as illustrated in FIG. 2A.

The first and second mechanical connectors 212 and 218 may mechanically and/or structurally engage the respective first and second connector portions 202 and 204 with the communication port, or complementary mechanical connectors thereof, of the respective electronic devices such that the hinge adapter 200 is attached to each of the two separate electronic devices to form a combined electronic device. Accordingly, each of the first and second mechanical connectors 212 and 218 may include any number of latches, pins, posts, bosses, clips or other suitable mechanical fastening components. In some implementations, each of the first and second mechanical connectors 212 and 218 may include specific attachment components to be able to interface with the specific communication port of the electronic device with which that connector portion is to engage. In other words, the first and second connector portions 202 and 201 may have differing mechanical connectors from one another if they are to each attach to a different type or style electronic device. In other situations, i.e., when the combined electronic device is to be comprised of two of the same type of electronic devices, the first and second connector portions 202 and 204 may have the same type of mechanical connectors. In some implementations, one or both of the mechanical connectors 212 and 218 may include a magnetic interface or post to mechanically engage with the communication port, or complementary mechanical connectors thereof, of the respective electronic device.

The first and second electrical connectors 214 and 220 may be similar to one another in some examples, and may be different from one another in other examples, depending on the types of electronic devices that the first and second connector portions 202 and 204 are to attach to or engage with. In some implementations, the first and second electrical connectors 214 and 220 may include electrical contacts, traces, pads, pins, or, in further examples, spring-loaded electrical pins or contacts. The first and second electrical connectors 214 and 220 may have a suitable structure so as to electrically and/or communicatively engage with complementary electrical connectors of the respective electronic device, or communication port thereof. In further examples, the first and second electrical connectors 214 and 220 may be spring-loaded pogo pins.

In some implementations, hinge adapter 200 may include an electrical cable 226, or another type of component to transmit electrical or communication signals. The electrical cable 226, or other suitable component, may enable electrical communication between the first connector portion 202 and the second connector portion 204, or the electrical connectors thereof. Thus, when the first connector portion 202 is operably engaged with a first electronic device, and the second connector portion 204 is operably engaged with a second electronic device, the first and second electronic devices may be able to electrically communicate with one another through the hinge adapter 200. In some examples, the electrical cable 226, or other suitable component, may be engaged with the first and second electrical connectors 214 and 220, and may be disposed, or may run along a second end of the first and second connector portions 202 and 204, opposite from the first end.

In some examples, the hinge adapter 200 may further include a first hinge cover 208a and a second hinge cover 208b, referred to collectively as hinge covers 208. The first hinge cover 208a may enclose, at least partially, the first end of the first and second connector portions 202 and 204. In further, examples, the first hinge cover 208a may enclose, either partially or wholly, the hinge 206. Similarly, the second hinge cover 208b may enclose, either partially or wholly, the second end of the first and second connector portions 202 and 204, and/or the electrical cable 226. The hinge covers 208 each may be a sleeve, end cap, housing portion, or other at least partially hollow and/or tubular component to slide on and protect the respective first and second ends of the connector portions. The hinge covers 208 may protect the components within from dirt, dust, moisture, or other potential contaminants, and further protect the components within from impacts, drops, or other potentially damage-inducing events.

Figure 3A:
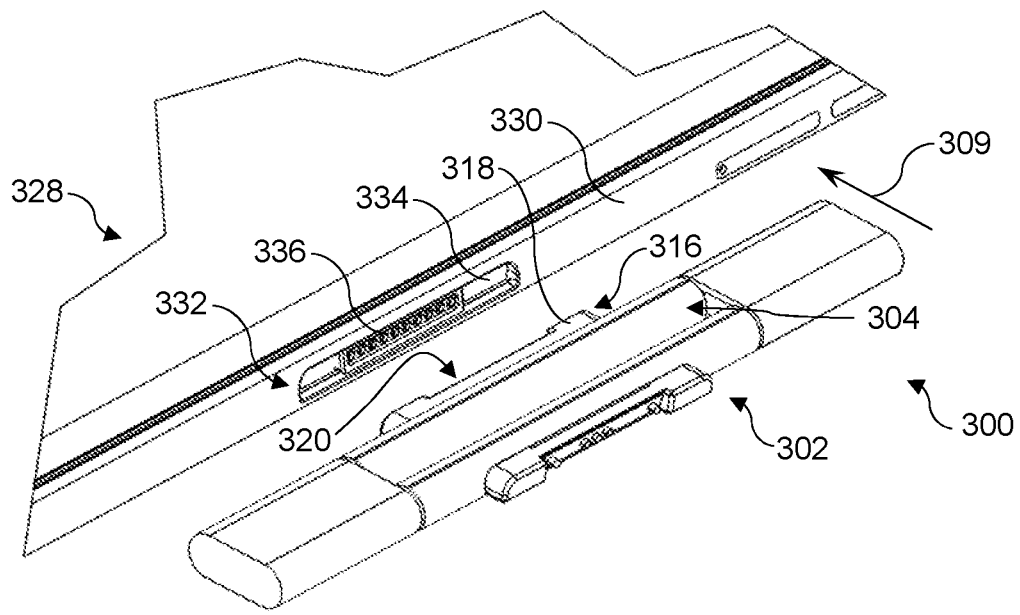
FIG. 3A is a perspective view of another example hinge adapter.
Figure 3B:
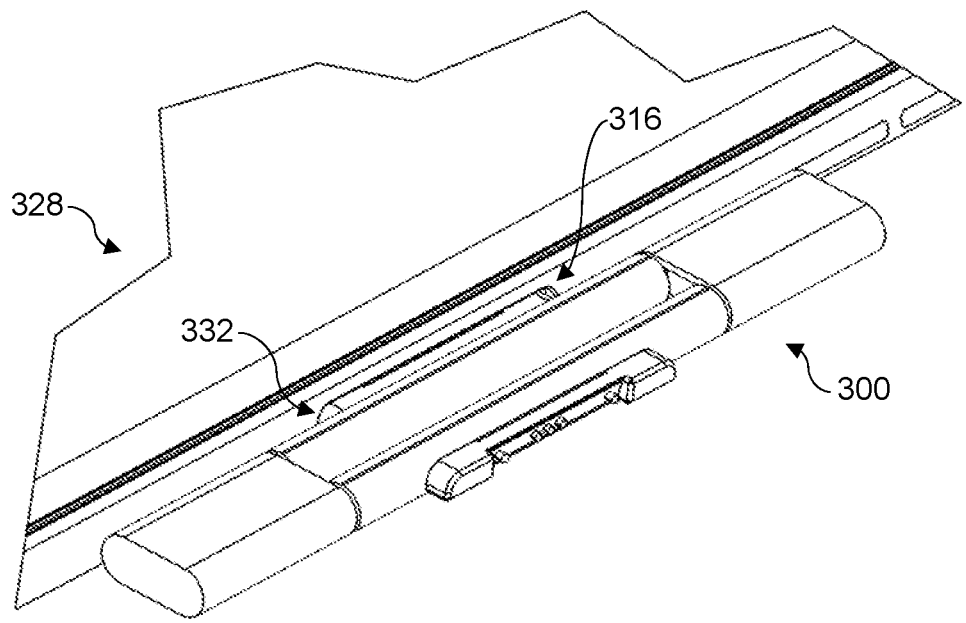
FIG. 3B is another perspective view of the example hinge adapter of FIG. 3A.

Referring now to FIGS. 3A-3B, perspective views of another example hinge adapter 300 is illustrated. Example hinge adapter 300 may be similar to other example hinge adapters described above. Further, the similarly-named elements of example hinge adapter 300 may be similar in function and/or structure to the respective elements of other example hinge adapters, as they are described above. Hinge adapter 300 may include a first connector portion 302 and a second connector portion 304. FIG. 3A illustrates the hinge adapter 300 as it is being engaged with or attached to an electronic device 328, for example, along attachment direction 309. Specifically, second connector portion 304 includes a second engagement portion 316, which is to be operably engaged with a complementary communication port 332 of the electronic device 328. Complementary communication port 332 may be disposed on a chassis or housing 330 of the electronic device 328 and may have a complementary electrical connector 336 and complementary mechanical connector 334. Second engagement portion 316 may include an electrical connector 320 and a mechanical connector 318 to respectively operably engage with the complementary electrical connector 336 and the complementary mechanical connector 334 of the complementary communication port 332. Communication port 332 may be considered complementary in the sense that it may be sized and structured so as to receive and be able to engage with the second engagement portion 316. Similarly, the electrical connector 336 and the mechanical connector 334 of the electronic device 328 may each be considered complementary in the sense that each may be able to receive, interface with, or operably engage with electrical connector 320 and mechanical connector 318, respectively, of the second connector portion 304.

The mechanical connector 318 may operably engage with the complementary mechanical connector 334 such that the hinge adapter 300 is removably attached to the electronic device 328. The electrical connector 320 may operably engage with the complementary electrical connector 336 such that electrical or signal communication may occur between the electrical connector 320 and the complementary electrical connector 336.

FIG. 3B illustrates the hinge adapter 300 as being fully and operably engaged or attached to the electronic device 328. After the second connector portion 304 is fully and operably engaged with the electronic device 328, the first connector portion 302 may also be fully and operably engaged with another, separate, electronic device (not shown) so as to form a complete combined electronic device. It should be noted that either the first or second connector portions 302 and 304 may be attached to an electronic device before the other, and no particular connection or engagement order may be necessary.

Figure 4A:
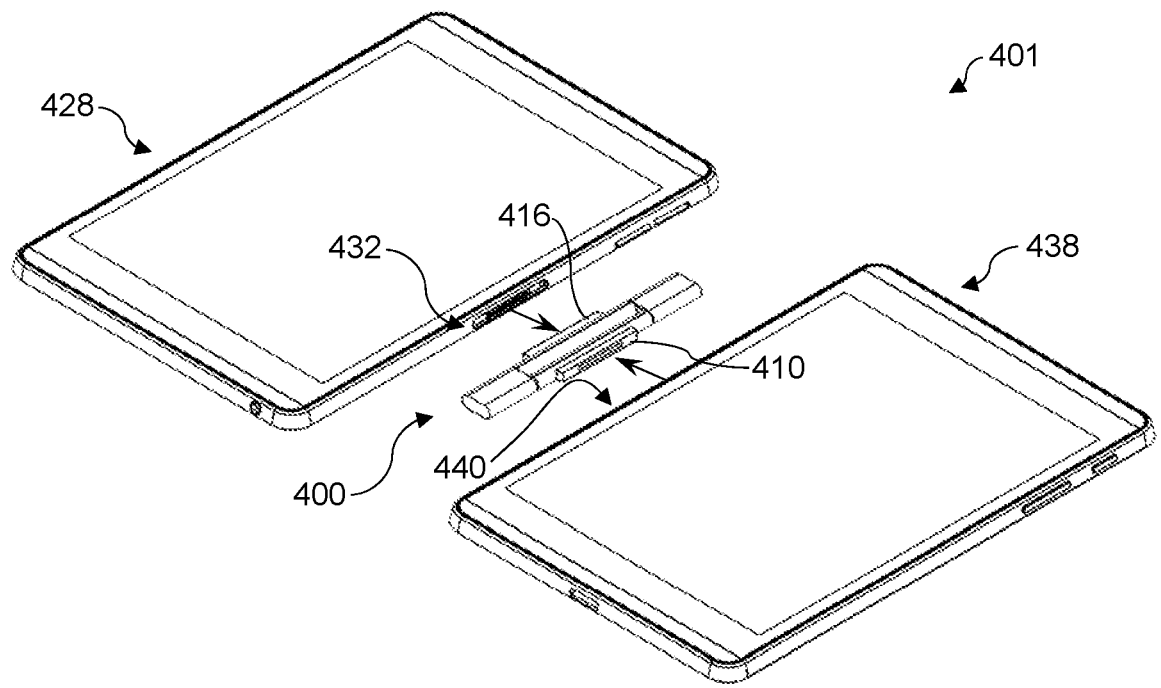
FIG. 4A is perspective view of an example combined electronic device having an example hinge adapter.
Figure 4B:
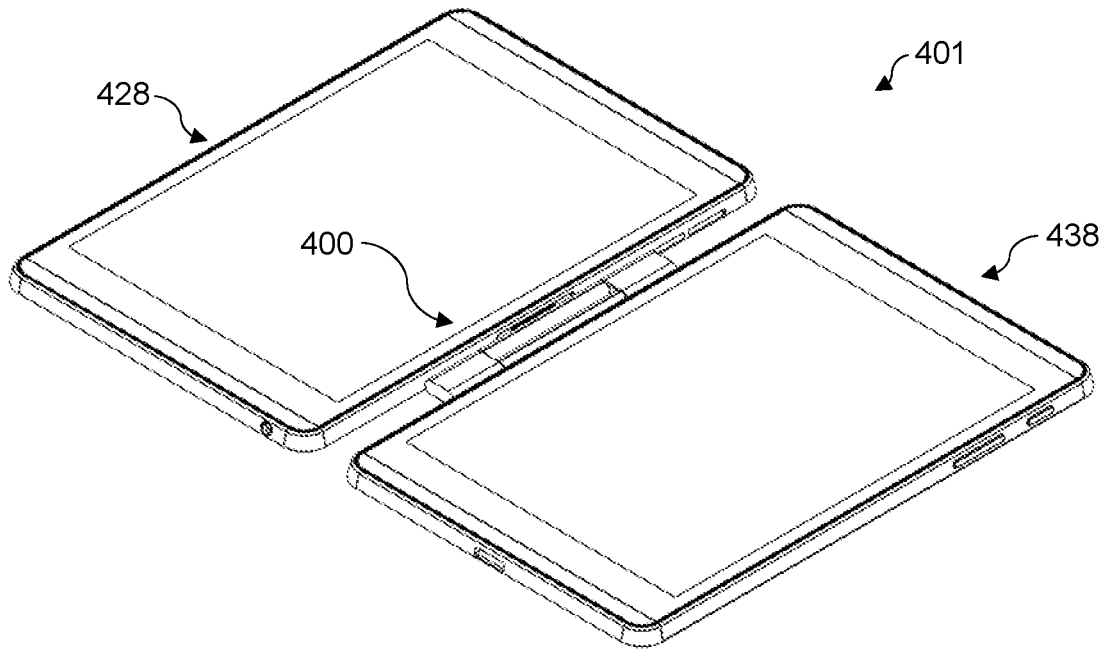
FIG. 4B is another perspective view of the example combined electronic device of FIG. 4A.

Referring now to FIGS. 4A-4B, perspective views of an example combined electronic device 401 having an example hinge adapter 400 are illustrated as the hinge adapter 400 is attached to or engaged with a first electronic device 438 and a second electronic device 428 of the combined electronic device 401. Example hinge adapter 400 may be similar to other example lunge adapters described above. Further, the similarly-named elements of example hinge adapter 400 may be similar in function and/or structure to the respective elements of other example hinge adapters, as they are described above.

As mentioned above, combined electronic device 401 may include a first electronic device 438 and a second electronic device 428. Each of the electronic devices may be a computing device, for example, a tablet computer, smartphone, e-reader, or another type of computing device which may benefit from being mechanically hinged and electrically engaged with an additional electronic device. First electronic device 438 may have a first complementary communication port 440, and second electronic device 428 may have a second complementary communication port 432. Further, hinge adapter 400 may include a first connector portion having a first engagement portion 410, and a second connector portion having a second engagement portion 416. First and second connector portions, or first and second engagement portions 410 and 416 thereof, may operably engage with first and second complementary communication ports 440 and 432, respectively. Further, first and second connector portions, or first and second engagement portions 410 and 416 thereof, may each have an electrical connector to engage with a complementary electrical connector of the respective first electronic device or second electronic device. The complementary electrical connectors may be a part of or may be disposed within the complementary communication ports of the first and second electronic devices 438 and 428. The electrical connectors of the first and second connector portions, or first and second engagement portions 410 and 416 thereof, may electrically engage with the complementary electrical connectors of the first and second electronic device 438 and 428 so as to enable electrical communication between the first and second electronic devices 438 and 428.

First and second connector portions, or first and second engagement portions 410 and 416 thereof, may further each include a mechanical connector to mechanically and/or structurally attach the hinge adapter 400 to complementary mechanical connectors of the first and second electronic devices 438 and 428. In other words, the complementary communication ports 440 and 432 of the first and second electronic devices 438 and 428 may be attached to the first and second engagement portions 410 and 416, respectively, such that the hinge adapter 400 and the first and second electronic devices 438 and 428 collectively form the combined electronic device 401, as illustrated in FIG. 4B. The mechanical connectors of the first and second connector portions may removably attach to or engage with the complementary mechanical connectors of the first and second electronic devices 438 and 428 such that each electronic device is subsequently able to be removed or detached from the hinge adapter 400, and also subsequently reattached. In some examples, each of the first and second electronic devices 438 and 428 may mechanically engage with the respective first and second connector portions (or first and second engagement portions 410 and 416 thereof) through a magnetic interface, such as magnetic lugs or posts, and complementary magnetic receptacles or pockets. It should be noted that, in some implementations, the hinge adapter 400 may omit the electrical connectors in the first and second connector portions and may only have the mechanical connectors. In such an implementation, the first and second electronic devices may electrically communicate with one another through wireless communication protocols, e.g., Bluetooth, Wi-Fi, and the like.

Figure 4C:
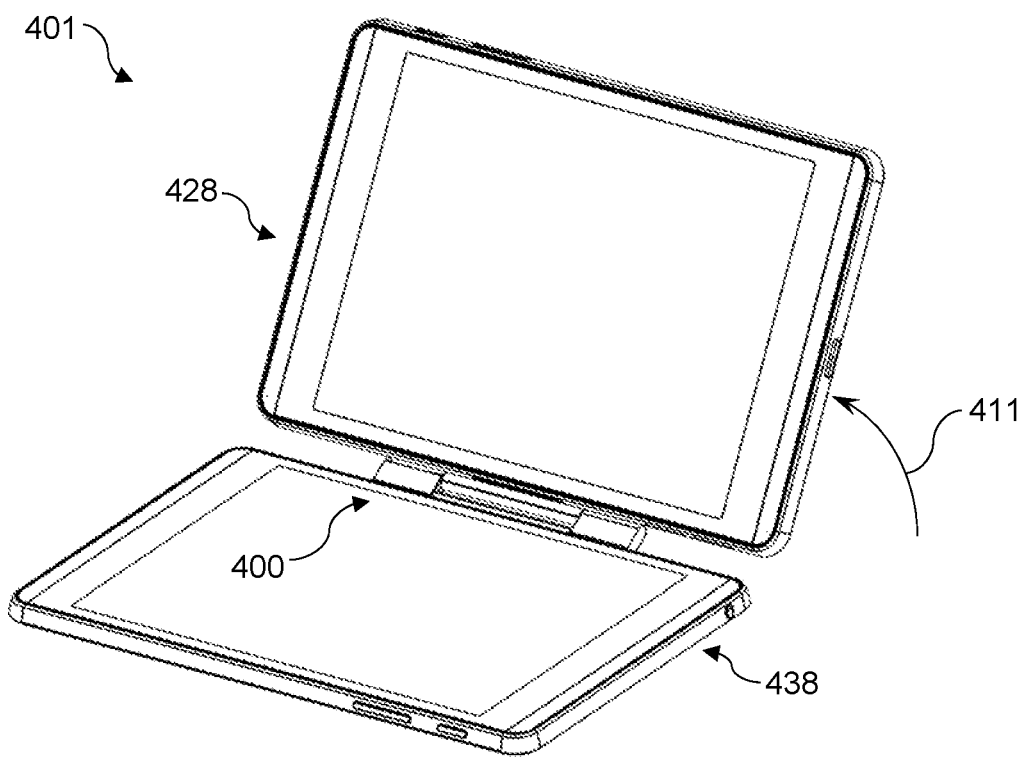
FIG. 4C is another perspective view of the example combined electronic device of FIG. 4A.
Figure 4D:
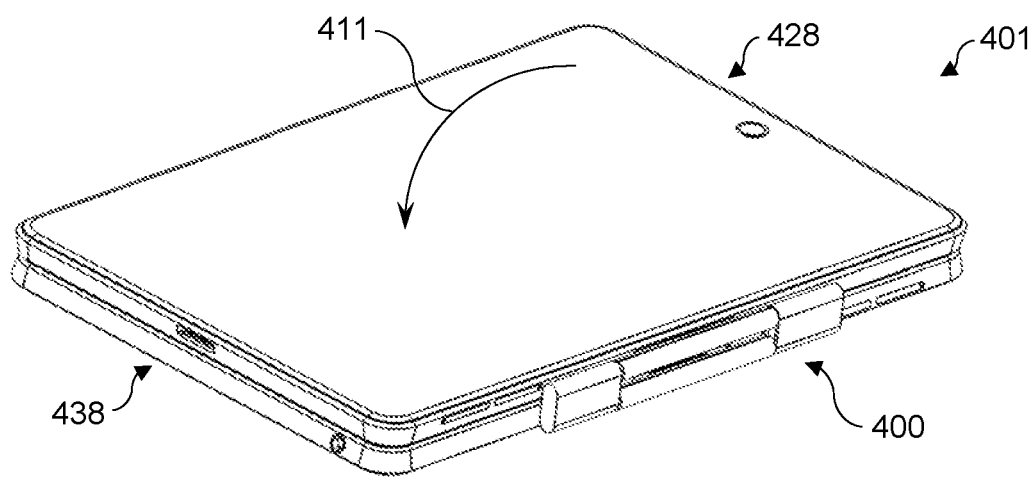
FIG. 4D is another perspective view of the example combined electronic device of FIG. 4A.
Figure 4E:
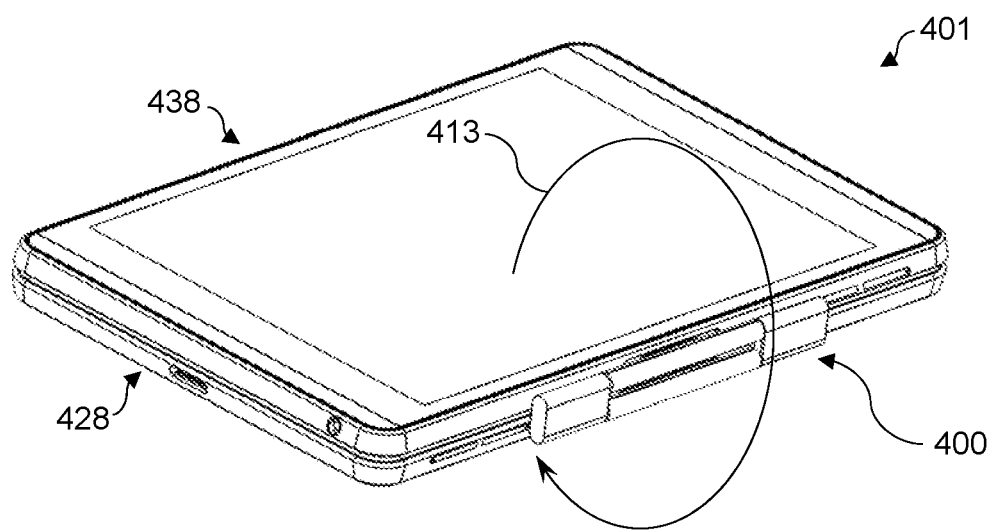
FIG. 4E is another perspective view of the example combined electronic device of FIG. 4A.

Referring now to FIGS. 4C-4E, perspective views of the example combined electronic device 401 are illustrated wherein the combined electronic device 401 is arranged in different orientations. Hinge adapter 400 may include a hinge such that, upon being engaged mechanically with the first and second electronic devices 438 and 428, the hinge adapter 400 may enable the first and second electronic devices 438 and 428 to be moved relative to one another, e.g., in a folding and unfolding manner. In some implementations, the hinge enables each of the first and second electronic device 438 and 428 to move or rotate at least 360 degrees relative to the other. For example, second electronic device 428 may be rotated by way of the hinge adapter 400 from a flat position, illustrated in FIG. 4B and wherein the combined electronic device 401 may be used as a large tablet-style computing device, along direction 411, to an open position, illustrated in FIG. 4C. In such an open position, combined electronic device 401 may resemble and function as a traditional clamshell-style notebook computing device, with second electronic device 428 operating as a display, and first electronic device 438 operating as a user input, keyboard, and/or trackpad. If second electronic device 428 is moved or rotated further along direction 411, the hinge may enable the first and second electronic device 438 and 428 to be able to fold or close against one another in a closed position, e.g., if the device is not in use, as illustrated in FIG. 4D. Such an orientation may resemble or mimic the closing action of a clamshell-style notebook computing device.

In yet further examples, from the closed position, second electronic device 428 may be moved in an opening direction 413, opposite from direction 411, back to the open clamshell position shown in FIG. 4C, the flat open configuration of FIG. 4B, or may continue along opening direction 413 for a 360 degree rotation to fold against the first electronic device 438 in a back-to-back configuration, as illustrated in FIG. 4E. In such an orientation, combined electronic device 401 may be used in a more compact tablet-style mode or a convertible notebook mode. Note, the illustrated positions and configurations are examples only, and other positions and configurations are contemplated, e.g., a tent or presentation mode, or other orientations of use. Additionally, while FIGS. 4C-4E are described with reference to second electronic device 428 moving relative to first electronic device 438, it should be noted that similar movement and reconfigurations are able to occur with first electronic device 438 moving relative to second electronic device 428. Further, if desirable, either or both of the two electronic devices may be separated from the hinge adapter, and each may be able to function independently as a standalone device.

What is claimed is:

1. A hinge adapter, comprising:
   a first connector portion comprising a first sleeve and a first electrical connector, wherein the first sleeve is a tubular structure having a first end and a second end, and wherein the first electrical connector is to removably engage with a first electronic device;
   a second connector portion comprising a second sleeve and a second electrical connector, wherein the second sleeve is a tubular structure having a first end and a second end, and wherein the second electrical connector is to removably engage with a second electronic device;
   a hinge connected to the first end of the first sleeve of the first connector portion and the first end of the second sleeve of the second connector portion, wherein the hinge enables the first connector portion to rotate relative to the second connector portion; and
   an electrical cable connecting the first electrical connector of the first connector portion to the second electrical connector of the second connector portion via the second end of the first sleeve and the second end of the second sleeve.

2. The hinge adapter of claim 1, wherein the first connector portion further comprises a mechanical connector to mechanically engage with a mechanical connector of the first electronic device, and the second connector portion further comprises a mechanical connector to mechanically engage with a mechanical connector of the second electronic device.

3. The hinge adapter of claim 2, wherein the first connector portion further comprises spring-loaded electrical contacts to electrically engage with an electrical connector of the first electronic device, and the second connector portion further comprises spring-loaded electrical contacts to electrically engage with an electrical connector of the second electronic device.

4. The hinge adapter of claim 3, wherein the spring-loaded electrical contacts are pogo pins.

5. The hinge adapter of claim 2, wherein the first connector portion further comprises a magnetic interface to mechanically engage with the mechanical connector of the first electronic device, and the second connector portion further comprises a magnetic interface to mechanically engage with the mechanical connector of the second electronic device.

6. The hinge adapter of claim 1, wherein the electrical cable enables electrical communication between the first electrical connector and the second electrical connector.

7. A hinge adapter, comprising:
a first connector portion comprising a first sleeve and a first electrical connector, wherein the first sleeve is a tubular structure having a first end and a second end, and wherein the first electrical connector is to removably engage with a first electronic device;
a second connector portion comprising a second sleeve and a second electrical connector, wherein the second sleeve is a tubular structure having a first end and a second end, and wherein the second electrical connector is to removably engage with a second electronic device;
a hinge engaged with a first end of the first and second sleeves, wherein the first connector portion is to rotate relative to the second connector portion via the hinge; and
an electrical cable connecting the first electrical connector of the first connector portion to the second electrical connector of the second connector portion via a second end of the first and second sleeves.

8. The hinge adapter of claim 7, wherein the hinge enables the first connector portion and the second connector portion to rotate axially relative to one another.

9. The hinge adapter of claim 8, further comprising a first hinge cover covering the first end of the first and second sleeves, and a second hinge cover covering the second end of the first and second sleeves.

10. A combined electronic device, comprising:
a first electronic device;
a second electronic device; and
a hinge adapter, comprising:
   a first connector portion comprising a first sleeve and a first electrical connector, wherein the first sleeve is a tubular structure having a first end and a second end, and wherein the first electrical connector is to removably engage with the first electronic device;
   a second connector portion comprising a second sleeve and a second electrical connector, wherein the second sleeve is a tubular structure having a first end and a second end, and wherein the second electrical connector is to removably engage with the second electronic device;
   a hinge connected to the first end of the first sleeve of the first connector portion and the first end of the second sleeve of the second connector portion, wherein the hinge enables the first connector portion to rotate relative to the second connector portion; and
   an electrical cable connecting the first electrical connector of the first connector portion to the second electrical connector of the second connector portion via the second end of the first sleeve and the second end of the second sleeve.

11. The combined electronic device of claim 10, wherein the first electronic device and the second electronic device are each tablet computers.

12. The combined electronic device of claim 11, wherein the first electronic device is to rotate relative to the second electronic device via the hinge.

13. The combined electronic device of claim 12, wherein the first electronic device is to fold against the second electronic device in a closed position, and to fold away from the second electronic device in an open position.

14. The combined electronic device of claim 10, wherein the first electrical connector is to engage with a complementary electrical connector of the first electronic device, and the second electrical connector to engage with a complementary electrical connector of the second electronic device, and wherein the first and second electrical connectors of the first and second connector portions are electrically engaged with one another via the electrical cable to enable electrical communication between the first electronic device and the second electronic device.

15. The combined electronic device of claim 10, wherein the first electronic device is mechanically engaged with the first electrical connector through a first magnetic interface, and the second electronic device is mechanically engaged with the second electrical connector through a second magnetic interface.

* * * * *